E. J. COLE.
NUT LOCK.
APPLICATION FILED JULY 11, 1921.
1,438,097.
Patented Dec. 5, 1922.
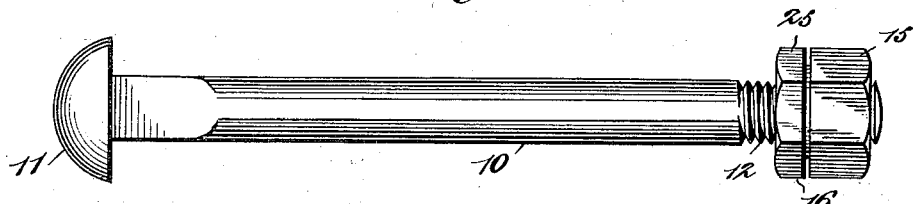
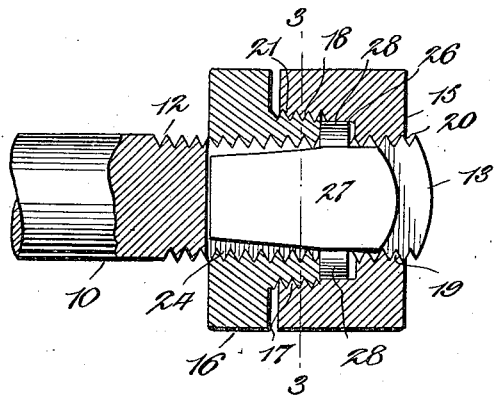
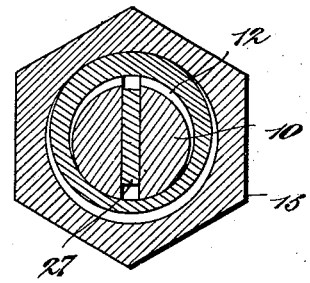
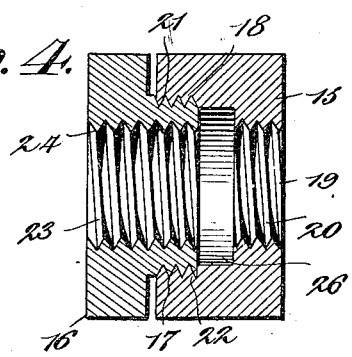
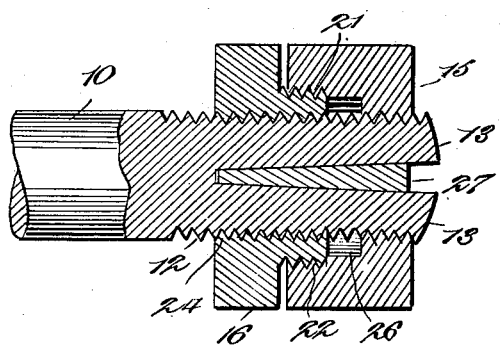
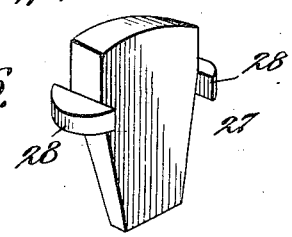
Edward J. Cole,
INVENTOR
BY Victor J. Evans
ATTORNEY
WITNESS:

Patented Dec. 5, 1922.

1,438,097

UNITED STATES PATENT OFFICE.

EDWARD J. COLE, OF PEEKSKILL, NEW YORK.

NUT LOCK.

Application filed July 11, 1921. Serial No. 483,819.

*To all whom it may concern:*

Be it known that I, EDWARD J. COLE, a citizen of the United States, residing at Peekskill, in the county of Westchester and State of New York, have invented new and useful Improvements in Nut Locks, of which the following is a specification.

This invention relates to nut locks and analogous devices.

Some of the objects of the present invention are: to produce a device for effectively securing a plurality of parts together which includes a nut made up from sections which are detachably connected and so designed as to loosely retain means which constitutes the essential part in effecting a locking assemblage; to produce a nut of separable sections which are designed to retain a wedge for use, and allowing the removal and substitution of the wedge when the occasion demands; to combine a screw threaded headed bolt having flexible portions with a nut having a wedge disposed diametrically of its screw threaded bolt hole, and being relatively movable, which wedge serves to flex the said flexible portions of the bolt to effect a locking engagement of the nut with the bolt when the nut and bolt are employed for the purposes for which nuts and bolts are employed. With these and other objects in view the invention resides in the particular provision, construction and employment of parts hereinafter more fully described and illustrated in the accompanying drawing, in which:

Figure 1 is a side elevation of a bolt and nut of the present invention.

Figure 2 is an enlarged central longitudinal sectional view through the nut and a part of the bolt.

Figure 3 is a transverse sectional view taken on the line 3—3, Figure 2.

Figure 4 is a sectional view of the nut with the wedge removed.

Figure 5 is a view similar to the view shown in Figure 2 but the present view is taken in a plane at a right angle to the plane through which the section of Figure 2 was taken.

Figure 6 is a perspective view of the wedge detached from the nut.

Referring now more particularly to the several views for all of the details it will be manifest that, the device of the present invention includes a bolt 10 having a head 11 at one end, and which is screw threaded as at 12 at the other end, and which is bifurcated to provide flexible portions 13, 13. The device also includes a nut 14 comprising sections 15 and 16. The section 15 is provided with a bore 17 having screw threads 18, and it is also provided with a bore or bolt hole 19 with screw threads 20. The section 15 on the outside has flat faces which affords means whereby the section may be readily manipulated by a tool such as a wrench. The section 16 of the nut has a nipple or reduced part 21 which is screw threaded as at 22 and which part 21 fits the bore 17. The section 16 is also provided with a bolt hole 23 which is screw threaded as at 24. The section 16 like the section 15 has flat faces 25 so as to accommodate a tool. The sections 15 and 16 when brought together form an annular way 26— see Figure 4.

As stated before it is one of the objects of the present invention to employ means for flexing portions of the bolt to effect the locking engagement of the nut with the said bolt. In the present instance there is employed a wedge 27 tapered from top to bottom. The wedge is provided with lateral projections 28, 28. The wedge is slightly less in width than the diameter of the bolt and consequently less than the diameter of bolt hole in the section 16. The wedge is retained by the bringing together of the sections 15 and 16, as a part of the nut 14, and the projections 28, 28 are disposed in the way 26 formed by the said sections. The projections 28, 28 are in the nature of segments and are disposed directly opposite each other. The outer faces of the projections are arcuate to conform to the side wall of the way 26, and because of this and the fact that the projections are directly opposite each other the wedge is maintained diametrically of the bolt hole 23 of the section 16. It follows from this that the nose of the wedge readily finds its way into the kerf of the bolt 10 as the nut 14 in its entirety is placed on the screw threaded end of the bolt. As the nut is screwed home the wedge moves down between the portions 13, 13. When the section 16 is brought against a thing to be secured, the section 15 may be moved relatively to the section 16 to cause the wedge to move still further into the kerf or space between the portions 13, 13 thus forcing the said portions 13, 13 outwardly into engagement with the nut sections and principally the section 16.

From the foregoing it will be manifest that, the wedge is loosely retained in the nut; the wedge is removable and therefore replaceable; the employment of a sectional nut allows the ready application of the bolt and nut and the effection of a locking engagement of the parts; and that aside from the locking engagement of the use of the wedge the sections 15 and 16 afford the advantages of jam-nuts.

What is claimed is:

1. The combination with a screw threaded headed bolt having relatively flexible portions at the screw threaded end thereof, of a sectional nut which coacts with said bolt, and means removably carried by the nut for flexing said portions into engagement with said nut.

2. The combination with a screw threaded headed bolt having relatively flexible portions at the screw threaded end thereof, of a sectional nut which coacts with said bolt, and a wedge loosely connected to said nut for flexing said portions into engagement with said nut.

3. The combination with a screw threaded headed bolt having relatively flexible portions at the screw threaded end thereof, of a sectional nut which coacts with said bolt, and a wedge loosely connected to said nut and disposed diametrically in the bolt hole thereof for flexing said portions into engagement with said nut.

4. For a bolt having flexible portions, a sectional nut removably carrying a relatively movable wedge for flexing the flexible portions of said bolt.

5. For a bolt having flexible portions, a sectional nut removably carrying a relatively movable wedge for flexing the flexible portions of said bolt, and means for maintaining the wedge disposed diametrically of the bolt hole of said nut.

6. For a bolt having flexible screw threaded portions, a nut of separable sections, the said sections forming an annular way, a wedge having lateral projections extendable in said way and allowing axial relative movement of the wedge with respect to the nut and substantially preventing longitudinal movement of the wedge with respect to the nut, the said wedge serving to flex said flexible portions to lock the nut onto the bolt.

In testimony whereof I hereby affix my signature.

EDWARD J. COLE.